United States Patent
Lindoff et al.

(10) Patent No.: US 9,014,169 B2
(45) Date of Patent: Apr. 21, 2015

(54) CELL SEARCH PROCEDURE FOR HETEROGENEOUS NETWORKS

(75) Inventors: Bengt Lindoff, Bjärred (SE); Fredrik Nordström, Lund (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 912 days.

(21) Appl. No.: 13/161,133

(22) Filed: Jun. 15, 2011

(65) Prior Publication Data

US 2012/0231790 A1    Sep. 13, 2012

Related U.S. Application Data (60) Provisional application No. 61/451,193, filed on Mar. 10, 2011.

(51) Int. Cl.
*H04J 3/06*    (2006.01)
*H04W 4/00*    (2009.01)
(Continued)

(52) U.S. Cl.
CPC .......... *H04W 48/16* (2013.01); *H04W 56/0015* (2013.01); *H04W 56/0085* (2013.01); *H04W 84/045* (2013.01); *H04W 84/047* (2013.01);
(Continued)

(58) Field of Classification Search
CPC .............. H04L 5/0048; H04L 25/0202; H04L 27/2655; H04L 25/0224; H04L 27/2613; H04L 5/0073; H04B 1/7083; H04J 11/0069; H04J 11/0073; H04J 11/0076; H04J 11/0079
USPC ......... 370/252, 350, 503, 507, 509, 510, 513, 370/328, 343; 455/422.1, 434, 456.1, 450
See application file for complete search history.

(56) References Cited

U.S. PATENT DOCUMENTS 8,009,661 B2 * 8/2011 Lindoff et al. ............... 370/350
8,488,528 B2 * 7/2013 Nagata et al. ............... 370/328
(Continued)

FOREIGN PATENT DOCUMENTS

| EP | 2315473 A1 | 4/2011 |
|---|---|---|
| WO | 2008042874 A2 | 4/2008 |
| WO | 2011057472 A1 | 5/2011 |

OTHER PUBLICATIONS

Ericsson, et al., "Further considerations of non-CA based enhanced ICIC", 3GPP TSG-RAN WG1 #61bis, Jun. 28-Jul. 2, 2010, pp. 1-4, Dresden, Germany, R1-104064.

(Continued)

*Primary Examiner* — Hoang-Chuong Vu
(74) *Attorney, Agent, or Firm* — Coats & Bennett, P.L.L.C.

(57) ABSTRACT

In a heterogeneous network, low power cells are detected by correlating a first and second signal originating from an unknown cell, such as synchronization signals, e.g., SSS received in a first and second time period (e.g., subframes 0 and 5 of a frame with corresponding sets of possible SSS signals. The cell identities for the candidate cells can be used to determine corresponding reference symbol sequences for the candidate cells. The final determination of the cell identity is then made by correlating a third signal originating from the unknown cell, such as a reference signal received in a third time period (e.g., an almost blank subframe or a broadcast subframe) with the set of reference signals for the candidate cells. The correct cell identity is determined to be the cell identity yielding the greatest correlation with its corresponding reference signal.

18 Claims, 8 Drawing Sheets

(51) Int. Cl.
*H04W 48/16* (2009.01)
*H04W 56/00* (2009.01)
*H04J 11/00* (2006.01)
*H04W 84/04* (2009.01)

(52) U.S. Cl.
CPC ............ *H04J 11/004* (2013.01); *H04J 11/0076* (2013.01)

(56) References Cited

U.S. PATENT DOCUMENTS

| | | |
|---|---|---|
| 2006/0126670 A1 | 6/2006 | Jeon et al. |
| 2007/0248068 A1* | 10/2007 | Onggosanusi et al. ....... 370/338 |
| 2008/0181317 A1 | 7/2008 | Kim |
| 2009/0116473 A1 | 5/2009 | Lindoff et al. |
| 2010/0279707 A1* | 11/2010 | Fischer et al. ............. 455/456.1 |
| 2010/0291925 A1* | 11/2010 | Nagata et al. ................. 455/434 |
| 2011/0009052 A1* | 1/2011 | Horiuchi et al. .................. 455/7 |
| 2011/0021155 A1 | 1/2011 | Ozaki et al. |
| 2011/0194430 A1* | 8/2011 | Yoo et al. ...................... 370/252 |
| 2011/0201332 A1* | 8/2011 | Siomina et al. ............... 455/434 |
| 2011/0207457 A1* | 8/2011 | Nagata et al. ................. 455/434 |
| 2011/0274097 A1* | 11/2011 | Zhang et al. .................. 370/338 |
| 2011/0280223 A1* | 11/2011 | Maeda et al. ................. 370/335 |
| 2011/0306341 A1* | 12/2011 | Klein et al. .................... 455/434 |
| 2012/0044928 A1* | 2/2012 | Bhattad et al. ................ 370/350 |
| 2012/0082022 A1* | 4/2012 | Damnjanovic et al. ........ 370/201 |
| 2012/0093267 A1* | 4/2012 | Zhou et al. ..................... 375/343 |
| 2012/0192020 A1* | 7/2012 | Kreuchauf et al. ............ 714/704 |
| 2012/0281574 A1* | 11/2012 | Pham et al. .................... 370/252 |
| 2012/0281629 A1* | 11/2012 | Zhou et al. ..................... 370/328 |
| 2013/0023204 A1* | 1/2013 | Ode et al. ...................... 455/11.1 |
| 2013/0065610 A1* | 3/2013 | Attar et al. .................. 455/456.1 |
| 2013/0065612 A1* | 3/2013 | Siomina et al. ............. 455/456.2 |
| 2013/0100902 A1* | 4/2013 | Chang et al. ................... 370/329 |
| 2013/0142165 A1* | 6/2013 | Swarts et al. .................. 370/330 |
| 2013/0208678 A1* | 8/2013 | Zhang ............................ 370/329 |
| 2014/0071963 A1* | 3/2014 | Swarts et al. .................. 370/336 |

OTHER PUBLICATIONS

Research in Motion UK Limited, "PSS/SSS Detection in Heterogeneous Networks", 3GPP TSG RAN WG1 Meeting #66, Aug. 22-26, 011, pp. 1-6, Athens, Greece, R1-112369.

International Search Report mailed Jun. 29, 2012 for International Application No. PCT/SE2012/050263 filed Mar. 9, 2012.

3rd Generation Partnership Project. "Way Forward on Candidate TDM Patterns for Evaluation of eICIC Intra-Frequency Requirements." TSG-RAN WG4 Meeting #57, R4-104932, Jacksonville, US, Nov. 15-19, 2010, Agenda Item: 15.5.1, pp. 1-3.

3rd Generation Partnership Project. "Link Simulation Assumptions for Studying Cell Identification for eICIC." 3GPP TSG-RAN WG4 Meeting #58, R4-111619, Taipei, Taiwan, Feb. 21-25, 2011, pp. 1-4.

\* cited by examiner

CELL SEARCH PROCEDURE FOR HETEROGENEOUS NETWORKS

RELATED APPLICATION

This application claims the benefit of U.S. Provisional patent Application 61/451,193 filed Mar. 10, 2011, which is incorporated herein by reference.

TECHNICAL FIELD

The present invention relates generally to heterogeneous networks comprising a mixture of low power and high power nodes with overlapping coverage and, more particularly, to cell search procedures implemented by wireless terminals operating in a heterogeneous network.

BACKGROUND

The new Third Generation Partnership Project (3GPP) standard known as Long Term Evolution (LTE) (3GPP LTE Rel-10) supports heterogeneous networks. In heterogeneous networks, a mixture of cells of different size and overlapping coverage areas are deployed. For example, a heterogeneous network may deploy low power cells served by relatively low power nodes within the coverage area of a macro cell served by relatively high power base stations. Heterogeneous networks could also deploy relatively low-power home base stations and relays to provide improved service in indoor areas. The aim of deploying low power nodes, such as pico base stations, home base stations, and relays, within a macro cell where coverage is provided by a high power base station, is to improve system capacity by means of cell splitting gains as well as to provide users with wide area experience of very high speed data access throughout the network. Heterogeneous deployment schemes represent one alternative to deployment of denser networks of macro cells and are particularly effective to cover traffic hotspots, i.e., small geographical areas with high user densities served by lower power nodes.

In heterogeneous networks, there may be a large disparity in output power of the low power nodes compared to the base stations serving macro cells. For example, the output power of the base stations in the macro cells may be in the order of 46 dBm, while the output power of the low power nodes in the low power cells may be less than 30 dBm. In Release 8 and 9 of the LTE standard, a wireless terminal is required to find and perform signal measurements for neighboring cells to support handover. The large difference in output power of the macro cells compared to the low power cells makes measurement of signals transmitted by the low power cells difficult.

Therefore there is a need for a method and apparatus enabling wireless terminals operating in heterogeneous networks to detect and measure signals transmitted by low power cells that could be up to 10-15 dB below the signals transmitted by overlapping macro cells.

SUMMARY

New cell search techniques are presented to enable detection of low power cells in heterogeneous networks, even when there is a large disparity in transmit power between the low power cells and high power cells. A signal received at wireless terminal comprises signals from the serving cell as well as signals from yet unknown cells.

Exemplary embodiments comprise methods of determining the cell identity of a cell in a wireless network. In one exemplary method, a first signal originating from an unknown cell in a first time period is correlated with a first set of possible synchronization signals to obtain a first set of correlations. A second signal originating from the unknown cell in a second time period is correlated with a second set of possible synchronization signals to obtain a second set of correlations. A candidate set of cell identities for the unknown cell is selected based on the first and second sets of correlations. A third signal originating from the unknown cell in a third time period is then correlated with a set of reference signals corresponding to the cell identities in the candidate set to obtain a third set of correlations. The cell identity associated with a reference signal in said third set having the greatest correlation with the third signal is selected as the final cell identity.

Other embodiments of the invention comprise a wireless terminal configured to perform a cell search procedure. One exemplary wireless terminal comprises a transceiver to communicate with a base station in the wireless network, and a control circuit including a cell search processor or cell search circuit for identifying neighbor cells from signals received by said transceiver. The cell search circuit is configured to correlate a first signal originating from an unknown cell in a first time period with a first set of possible synchronization signals to obtain a first set of correlations, and to correlate a second signal originating from an unknown cell in a second time period with a second set of possible synchronization signals to obtain a second set of correlations. The cell search circuit selects a candidate set of cell identities for the unknown cell based on the first and second sets of correlations. The cell search circuit is further configured to correlate a third signal originating from an unknown cell in a third time period with a set of reference signals corresponding to the cell identities in the candidate set to obtain a third set of correlations. The cell search circuit selects a final cell identity associated with a reference signal in said third set having the greatest correlation with the third signal.

As an example, candidate cells are identified by correlating e.g., the Secondary Synchronization Signal (SSS) received in the first and second time periods (such as subframes 0 and 5 of a frame) with corresponding sets of possible SSS signals. The cell identities for the candidate cells can be used to determine corresponding reference symbol sequences for the candidate cells. The final determination of the cell identity is then made by correlating e.g. a reference signal received in the third time period (such as an almost blank subframe or Multi-Media Broadcast over a Single Frequency Network (MBSFN) subframe) with the set of reference signals for the candidate cells. The correct cell identity is determined to be the cell identity yielding the greatest correlation with its corresponding reference signal.

DETAILED DESCRIPTION

Figure 1:
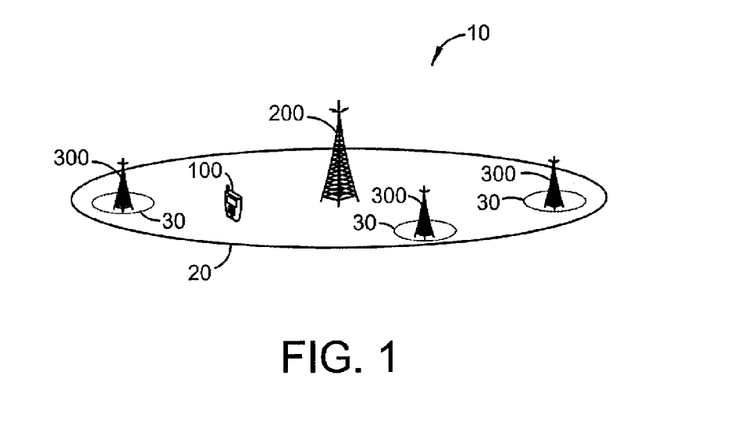
FIG. 1 illustrates macro and low power cell deployment in a wireless communication network.

Turning now to the drawings, FIG. 1 illustrates an exemplary heterogeneous communication network 10 according to one exemplary embodiment of the present invention. The embodiments of the present invention are described in the context of a Long-Term Evolution (LTE) network, which is specified in e.g. Release 10 of the LTE standard. However, those skilled in the art will appreciate that the invention may be applied in heterogeneous networks using other communication standards.

The communication network 10 comprises a plurality of high power access nodes 200 providing radio coverage in respective macro cells 20 of the communication network 10. In the exemplary embodiment shown in FIG. 1, three low power cells 30 served by low power access nodes 300 are deployed within the macro cell 20. The low power access nodes may comprise micro, pico, or femto base stations or home base stations. For convenience, the high power and low power access nodes 200, 300 will be referred to herein as high power and low power base stations respectively. As an example, the output power of the high power base stations 200 is presumed to be in the order of 46 dBm, while the output power of the low power base stations 300 is presumed to be less than 30 dBm. Therefore, wireless terminals 100 or user equipment (UE) served by low power cells may be subject to interference from the macro cells.

One approach for avoiding interference between the macro cells 20 and low power cells 30 is to use frequency separation between the different layers, i.e. macro and low power cells 20, 30 in FIG. 1. When frequency separation is used, the high power access nodes 200 and low power access nodes 300 operate on different non-overlapping carrier frequencies to reduce interference between the macro and pico layers. Cell splitting gains are obtained when the radio resources in the low power cell 30 can be simultaneously used when the macro cell 20 is transmitting. One drawback of frequency separation is that it may lead to inefficient resource utilization. For example, when the low power cell 30 is lightly loaded so that its resources are not fully utilized, it may be more efficient to assign all carrier frequencies to the macro cell 20. However, the split of carrier frequencies between layers is typically static.

In some heterogeneous networks 10, radio resources on same carrier frequencies are shared by the macro and pico layers by coordinating transmissions in the overlapping macro and low power cells 20, 30. This type of coordination is referred to as inter-cell interference coordination (ICIC). Certain radio resources are allocated for the macro cells 20 during some time period whereas the remaining resources can be accessed by low power cells 30 without interference from the macro cell 20. Depending on the load distribution across the layers, the resource split can change over time to accommodate different load distributions. In contrast to the splitting of carrier frequencies, sharing radio resources across layers using some form of ICIC can be made more or less dynamic depending on the implementation of the interface between the access nodes. In LTE, an X2 interface has been specified in order to exchange different types of information between access nodes. One example of such information exchange is that a base station 200 can inform other base stations 200 that it will reduce its transmit power on certain resources.

Time synchronization between base stations 200, 300 is required to ensure that ICIC across macro and pico layers will work efficiently in heterogeneous networks. Time synchronization is particularly important for time domain based ICIC schemes where resources on the same carrier are shared by macro and pico base stations.

Figure 2:
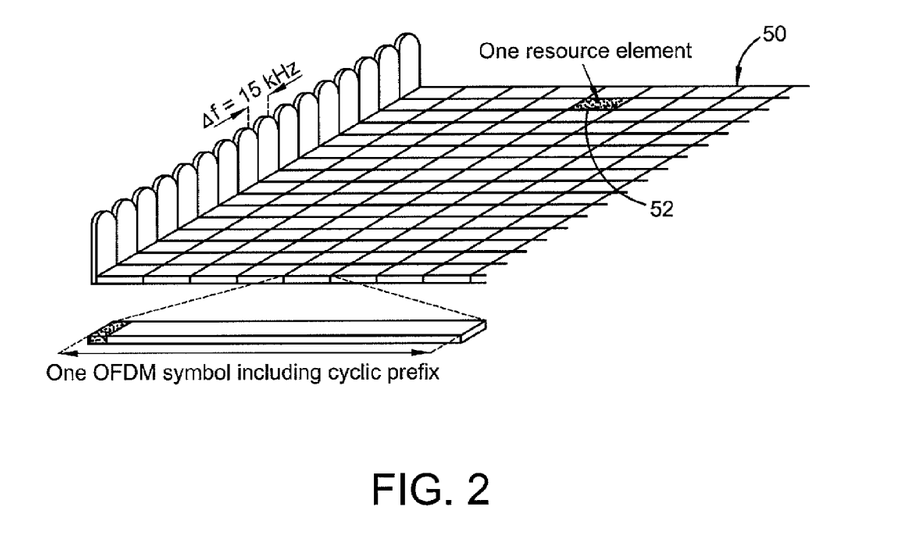
FIG. 2 illustrates downlink physical resources in an exemplary OFDM network.

LTE uses Orthogonal Frequency Division Multiplexing (OFDM) in the downlink and Discrete Fourier Transform (DFT) spread OFDM in the uplink. The available radio resources in LTE systems can be viewed as a time-frequency grid. FIG. 2 illustrates a portion of an exemplary OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe comprises fourteen OFDM symbols. A subframe comprises twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 50 is a resource element 52. A resource element 52 comprises one OFDM subcarrier during one OFDM symbol interval.

Figure 3:
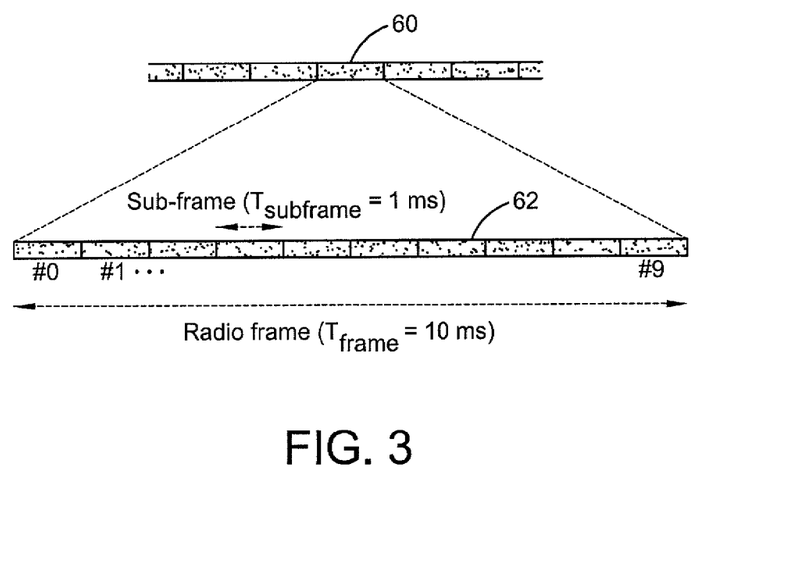
FIG. 3 illustrates time-domain structure in an exemplary OFDM network.

As shown in FIG. 3, the downlink transmissions are organized into 10 ms radio frames 60. Each radio frame 60 comprises ten equally-sized subframes 62. For purposes of scheduling users to receive downlink transmissions, the downlink time-frequency resources are allocated in units called resource blocks (RBs). Each resource block spans twelve subcarriers (which may be adjacent or distributed across the frequency spectrum) and one 0.5 ms slot (one half of one subframe). The term "resource block pair" refers to two consecutive resource blocks occupying an entire one millisecond subframe.

Figure 4:
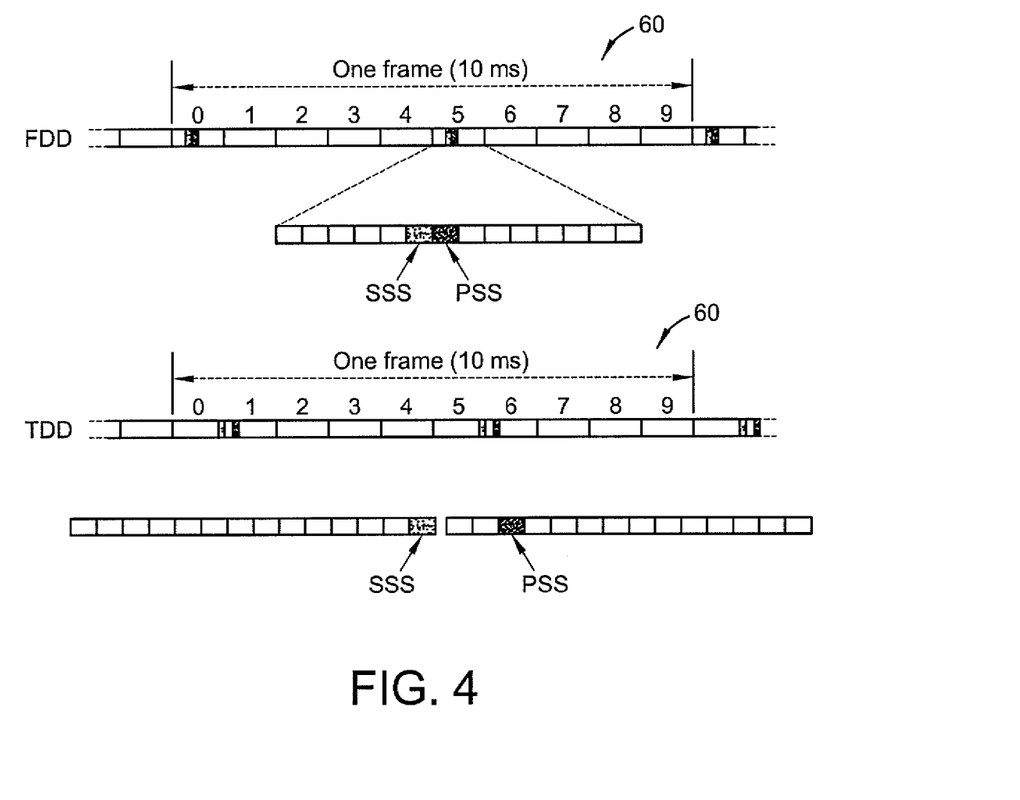
FIG. 4 illustrates the timing of synchronization signals for FDD and TDD in an exemplary OFDM network.

In order to establish a connection with the LTE network 10, the wireless terminal 100 needs to find and acquire synchronization with a cell 20, 30 within the network 10, read system parameters from a broadcast channel in the cell 20, 30, and perform a random access procedure to establish a connection with the cell 20, 30. The first of these steps is commonly referred to as cell search. To assist the wireless terminal 100 in the cell search procedure, the base station 200 transmits two synchronization signals on the downlink: the Primary Synchronization Signal (PSS) and the Secondary Synchronization Signal (SSS). The timing of the synchronization signals is illustrated in FIG. 4. For LTE radio frame structure type 1 (used for FDD deployments), the PSS and SSS are transmitted within the two last OFDM symbols in the first slot of subframes 0 and 5. For LTE radio frame structure type 2 (used for TDD deployments), the SSS is transmitted in the last OFDM symbol of subframe #0 and #5, whereas PSS is transmitted within the third OFDM symbol of subframe 1 and 6. The synchronization signals are transmitted in the center of the system bandwidth, occupying 6 resource blocks in the frequency domain. The difference in the positions of the synchronization signals in the case of FDD and TDD allows for the detection of the duplex scheme used on a carrier if this is not known in advance.

The synchronization signals transmitted in each cell 20, 30 comprise a specific set of sequences that define the cell identity. There are 504 different physical cell identities (PCIs)

defined for LTE, where each PCI corresponds to one specific downlink reference-signal sequence. The Pas are further divided into 168 cell-identity groups, with three PCIs within each group. The LTE standard specifies the location in time and frequency of the synchronization signals. The time-domain positions of the synchronization signals within the frame differ somewhat depending on if the cell 20, 30 is using frequency-division duplex (FDD) or time-division duplex (TDD). By detecting the synchronization signals, the wireless terminal 100 will acquire the timing of a cell 20, 30, and, by observing which of multiple sequences the cell is transmitting, the wireless terminal 100 can identify the cell 20, 30.

Within a cell, the two PSSs within a given radio frame are identical and take a different value depending on the PCI of the cell 20, 30. More specifically, the three cell identities within a cell-identity group always correspond to different PSS. Thus, once the wireless terminal 100 has detected the PSS of the cell 20, 30, it has the frame timing of the cell 20, 30 within 5 ms and the cell identity group of the cell 20, 30. Thus, the number of possible Pas has been narrowed to 168 rather than 504. Also, because the SSS has a fixed offset relative to the PSS, the wireless terminal 100 knows the position of the SSS. From the SSS, the wireless terminal 100 finds the exact frame timing (one of two possibilities based on the PSS) and determines the cell identity.

It should be possible for a wireless terminal 100 to determine frame timing and the cell identity from the reception of a single SSS because the search window may not be sufficiently large to cover more than one SSS. Accordingly, each SSS can take 168 different values corresponding to the 168 different cell-identity groups. Furthermore, the set of values valid for the two SSSs within a frame ($SSS_1$ in subframe 0 and $SSS_2$ in subframe 5) are different, implying that, from the detection of a single SSS, the wireless terminal 100 is able to determine whether $SSS_1$ or $SSS_2$ has been detected and thus determine the frame timing.

Once the wireless terminal 100 has acquired frame timing and the PCI of the cell 20, 30, the wireless terminal 100 has identified the cell-specific reference signal and can receive the necessary system information for accessing the cell 20, 30.

In the case where the wireless terminal 100 does not know which carrier frequency to search for the PSS and SSS, it may try multiple carrier frequencies. To simplify the cell search procedure, LTE is using a 100 kHz carrier raster, i.e., a carrier can only be located on frequencies being multiples of 100 kHz. The fixed spacing of carriers significantly reduces the number of candidate carrier frequencies a wireless terminal 100 needs to include in the cell search.

A wireless terminal 100 does not carry out cell search only at power-up, i.e. when initially accessing the system. In order to support mobility, the wireless terminals 100 need to continuously search for, synchronize to, and estimate the reception quality of signals transmitted by neighbor cells. The wireless terminals 100 may evaluate the reception quality of signals from the neighbor cells, in comparison to the reception quality of the current serving cell, to determine whether a handover (for wireless terminals 100 in connected mode) or cell re-selection (for wireless terminals 100 in idle mode) should be carried out. For wireless terminals 100 in connected mode, the network 10 makes the handover decision based on measurement reports provided by the wireless terminals 100.

The measurement reports provided by the wireless terminal 100 may include measurements of the reference signal received power (RSRP) and/or reference signal received quality (RSRQ). Depending on how these measurements, possibly complemented by a configurable offset, are used, the wireless terminal 100 can be connected to the cell 20, 30 with the strongest received power, or the cell 20, 30 with the lowest path loss, or a combination of the two. These selection criteria (received power and path loss) do not necessarily result in the same selected cell 20, 30. Because the output power varies for different types of cells 20, 30, it is possible that, for a given wireless terminal 100, the cells 20, 30 with the highest RSRP and RSRQ measurements and the cells 20, 30 with the lowest path loss are different. This situation is referred to herein as link imbalance.

Figure 5:
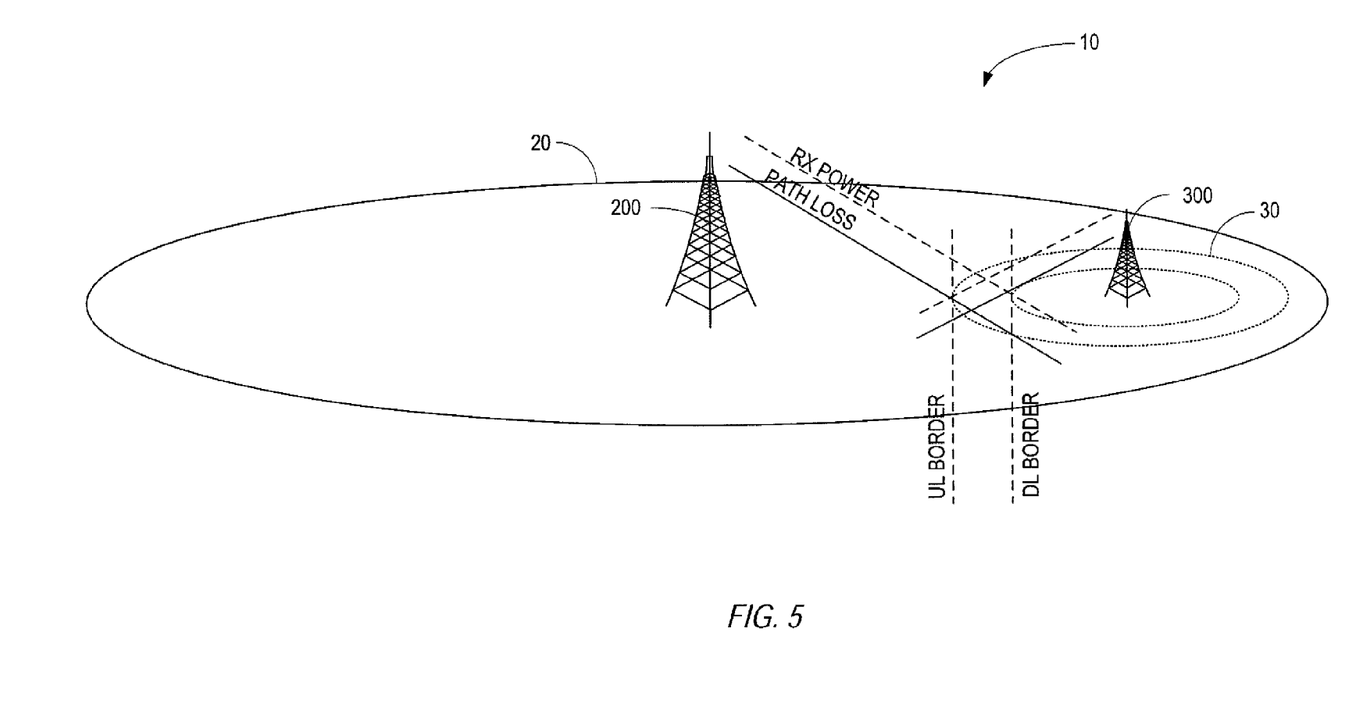
FIG. 5 illustrates uplink and downlink coverage in a mixed cell scenario in an exemplary OFDM network.

FIG. 5 illustrates how link imbalance can occur in a heterogeneous network 10. It is realistically presumed for purposes of this example that the output power of a pico base station 300 in the low power cell 30 is in the order of 30 dBm or less, while the output power of the macro base station 200 is in the order of 46 dBm. Consequently, when the wireless terminal 100 is operating near the cell edge of the low power cell 30, the received signal strength from the macro cell 20 can be much larger than that of the low power cell 30. However, the path loss to the base station 200 in the macro cell 20 may be greater than the path loss to the pico base station 300 in the low power cell 30.

In FIG. 5 the downlink border (DL) indicates the point at which the received signal strength from the high power or macro cell 20 and low power cell 30 is equal. The uplink border (UL) indicates the point at which the path loss to the base stations 200, 300 in the macro cell 20 and low power cell 30 respectively are equal. The region between the DL and UL borders is the link imbalance zone. From a downlink perspective, it may be better for a wireless terminal 100 in the link imbalance zone to select a cell 20, 30 based on downlink received power, but from an uplink perspective, it may be better to select a cell 20, 30 based on the path loss because the transmit power of the wireless terminal 100 is limited. In this scenario, it might be preferable from a system perspective for the wireless terminal 100 to connect to the low power cell 30 even if the macro downlink is up to 10-20 dB stronger than the low power cell downlink. Therefore, the wireless terminal 100 needs to detect and measure signals from the low power cells 30 even when there is a large disparity in the signal power as compared to the macro cells 20.

One method of coordinating the transmission of the PSS and SSS between macro and pico layers is to introduce a relative time-shift of the radio frames between macro cells 20 and low power cells 30. In this approach, the macro base station 200 is aware of the PSS/SSS transmissions on the pico layer and can then avoid scheduling data (at least) in resource elements that collide with transmissions of the PSS and SSS by the low power cell 30. Furthermore, the pico base station 300 may avoid scheduling data in resource elements that collide with the PSS and SSS transmission by the macro cell 20. This inter-cell interference coordination would be needed when the wireless terminals 100 operate within region of the UL border and the DL border depicted in FIG. 4.

Figure 6:
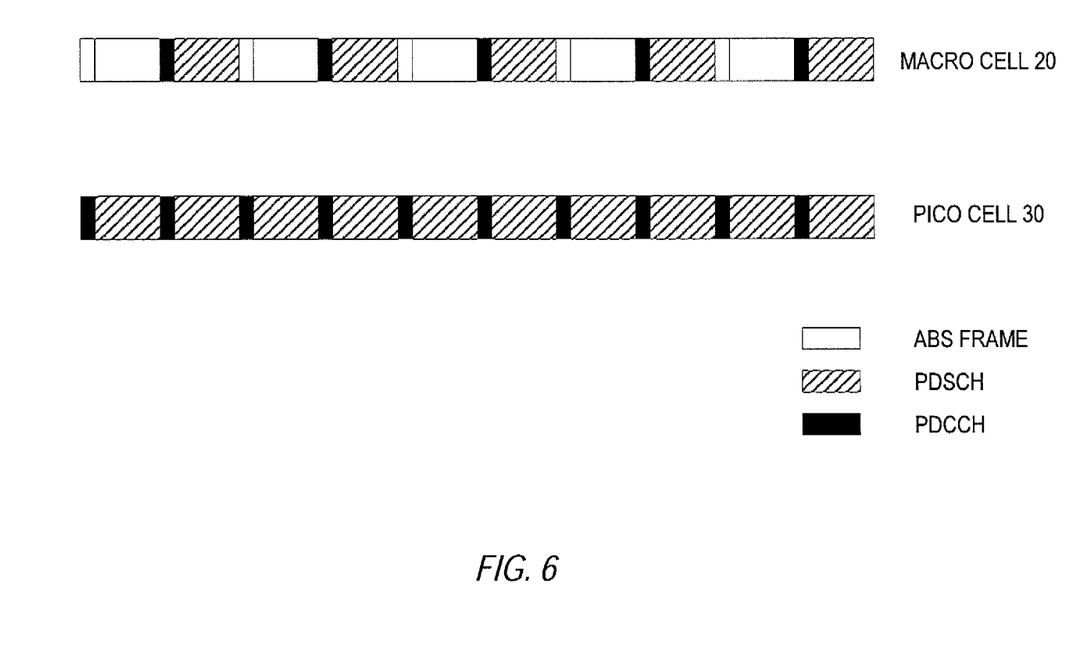
FIG. 6 illustrates inter-cell interference coordination between macro cells and low power cells.

One approach of providing ICIC across layers is illustrated in FIG. 6, where an interfering macro cell 20 does not transmit control information (such as on the Physical Downlink Control Channel, PDCCH), and thus no data (such as on the Physical Downlink Shared Channel, PDSCH), in some subframes. The low power cell 30 is aware of the locations of these "almost blank" subframes (ABSs) (the non-filled subframes in FIG. 6) and can schedule downlink transmissions to cell edge wireless terminal 100 (wireless terminals 100 operating within the link imbalance zone) in subframes aligned with the almost blank subframes at the macro cell 20. The "almost blank" subframes are referred to herein as restricted subframes since only the low power cells are allowed to schedule downlink transmissions in these subframes. Subframes in which the macro cells are allowed to schedule downlink transmission are referred to herein as unrestricted subframes. In these subframes, the macro cells 20 are allowed to transmit the PDCCH (indicated by black in FIG. 6) and the PDSCH (indicated by diagonal fill in FIG. 6). For legacy wireless terminals, the macro cell 20 still needs to transmit cell specific reference symbols (CRSs) in all subframes so the restricted subframes will not be completely empty. Wireless terminals 100 operating inside the downlink border can be scheduled in all subframes.

Almost blank subframes can be created in two ways: by scheduling ABSs as described above, or by enabling the MBSFN subframes (broadcast subframes), already defined in the Release 8 of the LTE standard. In the MBSFN subframes, the first OFDM symbol only includes CRSs. Thus, in this case the CRSs from the macro cell 20 are (from a legacy perspective) transmitted in the first OFDM symbol only, unlike the ABS case where the CRSs are transmitted in OFDM symbols 0, 4, 7 and 11 in each sub frame.

Because the cells in 20, 30 in the heterogeneous network 10 are time synchronized, the synchronization signals transmitted by macro cells 20 will still interfere with synchronization signals transmitted by the low power cells 30, even when almost blank subframes or MBSFN subframes are used. That is, even when almost blank subframes are used, the macro cells 20 must still transmit the synchronization signals in subframes 0 and 5. As previously noted, the transmit power from the low power cells 30 may be −12 to −15 dB below the macro cells. To perform cell search, the synchronization signals transmitted by the macro cells 20 still need to be detected. Current approaches to cell search and synchronization will likely fail when the transmit power of the low power cells 30 drops to about −8 to −10 dB below the transmit power of the macro cells 20.

Successive interference cancellation (SIC) techniques can be used to detect the synchronization signals from the low power cells 30. The basic idea behind successive interference cancellation is to detect the strongest signals first and subtract them from the received signal. After the subtraction of the strongest signals, the weaker signals can then be detected. Applied to the cell search procedure, the synchronization signals from the macro cells may be detected first and then subtracted from the received signal to obtain a reduced interference signal. The reduced interference signal can then be used for detecting synchronization signals from the low power cells 30.

Successive interference cancellation, however, does not resolve all problems in the detection of the synchronization signals transmitted from the low power cells 30. When interference cancellation is performed, there will always be some estimation error. Thus, the reduced interference signal will still contain residual interference that has not been cancelled and that can interfere with the detection of the synchronization signals from the low power cells 30. Further, the SSS in LTE is constructed from two subsequences, denoted herein as S1 and S2. Depending on cell planning, some neighboring cells may have one of the two subsequences in common. Thus, the interference cancellation step may result in partial cancellation of the SSS from the low power cells 30 in either subframe 0 or subframe 5.

Exemplary embodiments of the present invention provide a new cell search procedure that enables detection of synchronization signals from, and identification of, the low power cells. A signal received at wireless terminal 100 comprises signals from the serving cell as well as signals from yet unknown cells. In one exemplary embodiment, candidate cells are identified by correlating first and second signals originating from an unknown cell in first and second time periods, such as the synchronization signals (e.g., SSS) received in subframes 0 and 5 of a subframe with corresponding sets of possible SSSs. The cell identities for the candidate cells can be used to determine corresponding reference signals (RSs) for the candidate cells. The final determination of the most likely candidate cell can be made by correlating a third signal originating from the unknown cell in a third time period, such as a RS received in an almost blank subframe or MBSFN subframe with the set of RSs for the candidate cells. The correct cell identity is determined to be the cell identity yielding the greatest correlation metric with its corresponding RS.

In some embodiments, the wireless terminal 100 is configured with a "restricted measurement pattern" for possible serving neighboring cells, indicating which subframes on which the wireless terminal 100 should perform RSRP/RSRQ (or CQI) measurements. A pattern is a bit string indicating restricted and unrestricted subframes characterized by a length and periodicity. In that case, the correlation may be done to RSs received in these restricted subframes. Typically, but not always, the restricted measurement pattern follows the ABS/MBSFN subframe pattern. Restricted measurement subframes are configured to allow the wireless terminal 100 to perform measurements in subframes with improved interference conditions, which may be implemented by configuring ABS patterns at the base stations. Restricted measurement patterns are in general terminal-specific. The ABS pattern is a transmission pattern at the radio node, it is cell specific, and may be different from the restricted measurement patterns signaled to the wireless terminal 100. ABS patterns may be exchanged between base stations via an interface, but these patterns are not signaled to the wireless terminal 100.

In some embodiments of the invention, successive interference cancellation may additionally be applied prior to correlating the SSS in subframes 0 and 5. More particularly, the SSS from a previously-detected cell may be subtracted from the received SSS before correlating the received SSS from the unknown cell. The SSS from the previously-detected cell may be equalized using channel estimates determined from a PSS for the previously-detected cell.

Figure 7:
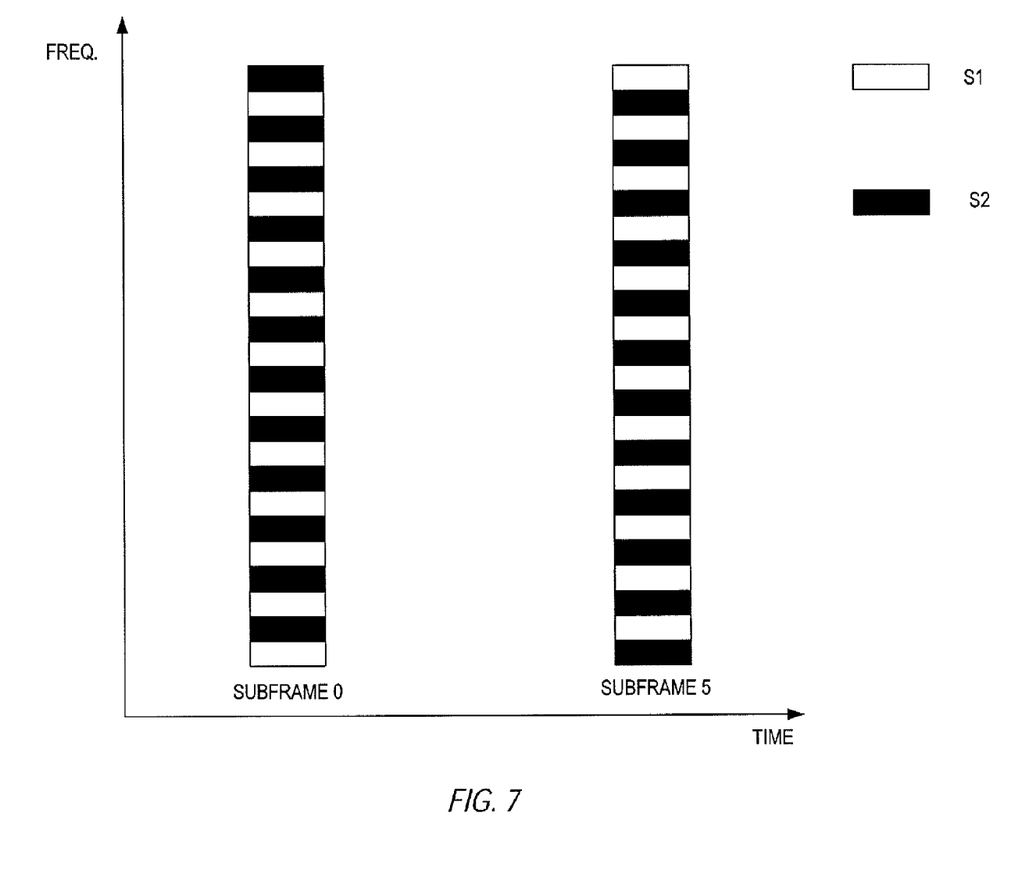
FIG. 7 illustrates frequency separation of standard and supplemental synchronization signals transmitted by a pico base station.

FIG. 7 illustrates the structure of a SSS in subframe slots 0 and 5. The SSS is constructed from two subsequences, S1 and S2, which are interleaved into frequency domain. In subframe 0, synchronization symbols are alternately selected from subsequences S1 and S2 beginning with sequence S1. In subframe 5, synchronization signals are alternately selected from subframes S2 and S1 beginning with S2. The SSS for a given cell is scrambled based on the PSS for the cell. Further, subsequence S2 is scrambled based on S1. In synchronized networks, the gain from using the PSS for detection is limited because the PSSs for all cells are time synchronized. However, because the SSS is scrambled based on the PSS, the SSS alone can be used for cell identification.

Figure 8:
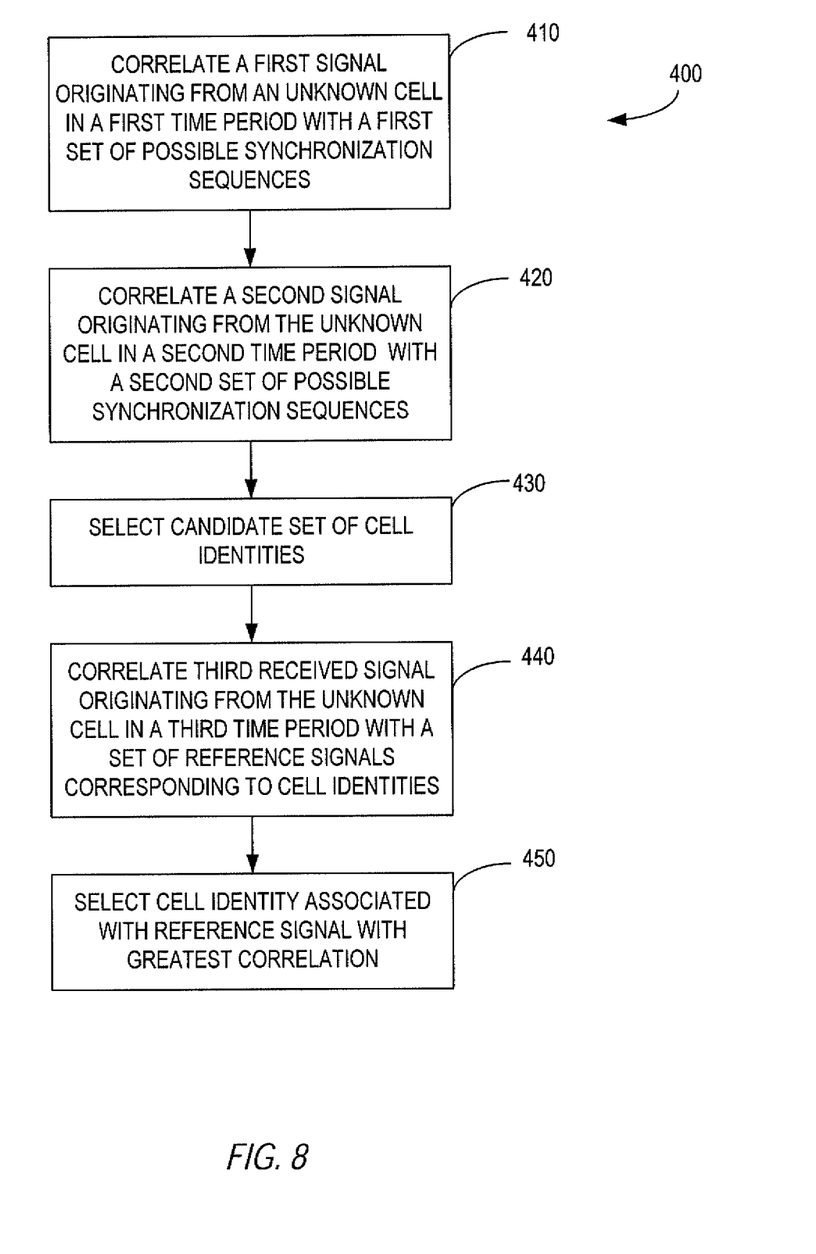
FIG. 8 illustrates an exemplary cell search procedure implemented by a wireless terminal.

FIG. 8 illustrates an exemplary search procedure 400 for identifying unknown cells which may be implemented by a wireless terminal 100. To begin the cell search procedure 400, the wireless terminal 100 correlates a first signal originating from an unknown cell in a first time period with a first set of possible synchronization sequences (block 410). As previously noted, the first signal in the first time period may comprise a SSS transmitted in subframe 0 of a radio frame. The correlation yields a first set of correlation metrics. The wireless terminal 100 also correlates a second signal originating from the unknown cell in a second time period with a second set of possible synchronization sequences (block 420). The second signal in the second time period may comprise the SSS transmitted in subframe 5 of the radio frame. The second correlation step provides a second set of correlation metrics. The detected correlation metrics and the corresponding cell IDs can then be stored in memory.

The first and second sets of correlation metrics may be used by the wireless terminal 100 to select a set of candidate cell identities (block 430). More particularly, the wireless terminal 100 may select one or more cell identities based on the first set of correlation metrics, and one or more cell identities based on the second set of correlation metrics. The candidate set should preferably include the cell ID with the highest correlation in the first time period, and the cell ID with the highest correlation in the second time period.

Once the candidate set of cell identities is determined, the wireless terminal 100 correlates a third signal originating from the unknown cell in a third time period with a set of reference symbols corresponding to the cell identities in the candidate set (block 440). For example, the third signal may comprise a reference signal transmitted by the unknown cell in an almost blank subframe or broadcast subframe, e.g. MBSFN subframe, as examples of the third time frame. The location of the almost blank subframes or MBSFN subframe may be signaled to the wireless terminal 100 by the serving cell using radio resource control (RRC) or medium access control (MAC) signaling, or during connection set up. The correlation of the reference signal transmitted in the ABS subframe or MBSFN subframe yields a third set of correlation metrics, one for each cell identity in the candidate set. The correlation metric may be computed, for example, by multiplying the received symbols by the expected symbols and accumulating the squared magnitude of the products. The wireless terminal 100 then selects the cell identity with the greatest correlation metric as the final cell identity (block 450).

Figure 9:
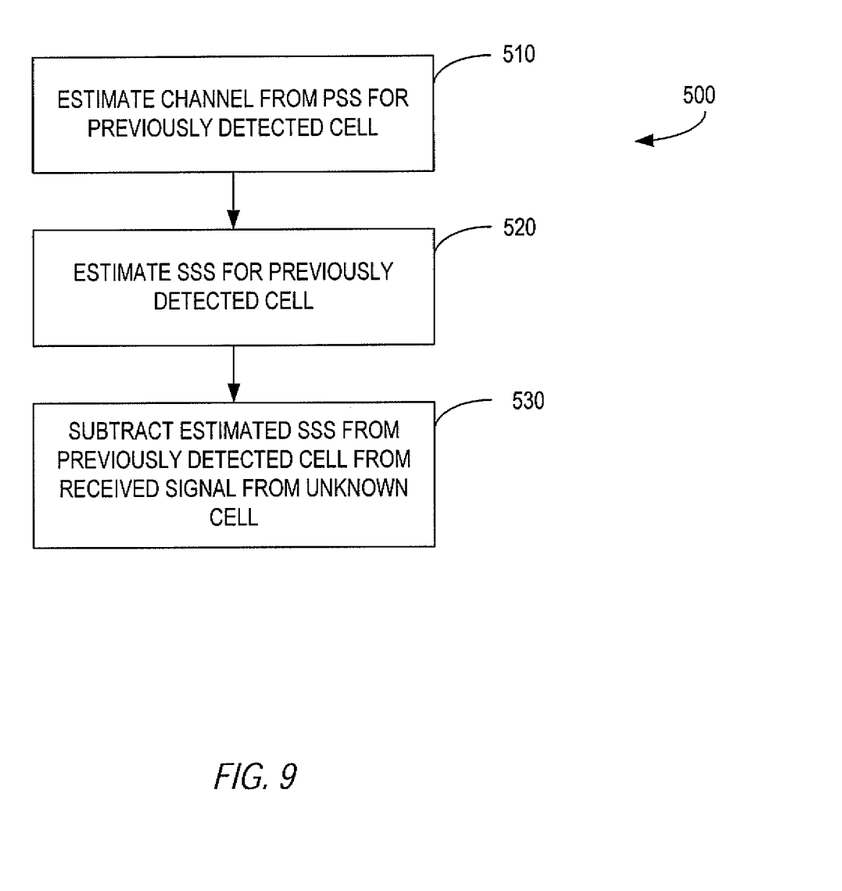
FIG. 9 illustrates an exemplary inference cancellation procedure implemented by a wireless terminal.

In some exemplary embodiments of the invention, successive interference cancellation techniques may be used to cancel interference from previously-detected cells before performing the cell search procedure shown in FIG. 8. FIG. 9 illustrates an exemplary successive interference cancellation procedure 500 according to one embodiment. The wireless terminal 100 generates a channel estimate for a previously-detected cell using the PSS for the previously detected cell as pilot signals (block 510). Assuming two cells, the received PSS symbol for resource elements i is given by:

$$Y_i^{\{p\}} = H_i \cdot P_1(i) + G_i \cdot P_2(i) + e_i^{\{p\}} \qquad \text{Eq. 1}$$

where the symbol $Y_i$ is received in resource element i, $H_i$, and $G_i$ are the radio channels for the two cells for resource element i, $P_j(i)$ is the PSS for cell j in resource element i, and $e_i^{\{p\}}$ is the noise in resource element i. The channel H per resource element i for cell 1 can be estimated as:

$$\hat{H}_i = \frac{1}{2L+1} \sum_{m=i-L}^{i+L} Y_m \cdot P_1^H(m) \qquad \text{Eq. 2}$$

where $P^H$ indicates the Hermetian transpose of P and 2L+1 is the total number of resource elements used for channel estimation, and m is a RE index. Typically, the channel H is assumed to be constant over a subset of all resource elements, and several channel estimates over the entire PSS are made.

The channel estimate is used to estimate the received SSS symbol from the previously-detected cell (block 520). The SSS symbol is modeled by:

$$Y_i^{\{s\}} = H_i \cdot S_1(i) + G_i \cdot S_2(i) + e_i^{\{s\}} \qquad \text{Eq. 3}$$

where $S_j(i)$ is the SSS symbol for cell j in resource element i and $e_i^{\{s\}}$ is noise.

The estimated SSS symbol from the previously-detected cell is subtracted from the received SSS symbol to obtain a reduced interference symbol (block 530). The reduced interference symbol is modeled by:

$$\tilde{Y}_i = Y_i^{\{s\}} - \hat{H}_i \cdot S_1(i) \approx G_i \cdot S_2(i) + e_i^{\{s\}} + \epsilon_i \qquad \text{Eq. 4}$$

where $\epsilon_i$ is the estimation error in the subtraction process. The cancellation procedure 500 is repeated for both subframes 0 and 5.

Because the cell ID for one cell is unknown, the wireless terminal 100 does not know the PSS or the SSS for the unknown cell. Thus, it is possible that the two cells could share the same PSS. In this case, the channel estimation in block 510 will produce an estimate of H+G and the estimation error will also include parts of the unknown channel multiplied by the synchronization symbol. In this case, the reduced interference symbol is given by:

$$\tilde{Y}_i = Y_i^{\{s\}} - \hat{H}_i \cdot S_1(i) \approx G_i \cdot S_2(i) + e_i^{\{p\}} - G_i \cdot S_2(i) \qquad \text{Eq. 5.}$$

It is also possible that the SSS symbol for the unknown cell could share the subsequence S1 or S2 with the known cell. In some cases, both the PSS and one of the subsequences of the SSS are common for both cells. In this case, the subtraction step will result in partial cancellation of the SSS symbol from the unknown cell. This potential problem is mitigated in embodiments of the present invention by correlating the SSS received in both subframes 0 and 5 with the received SSS as described above.

Figure 10:
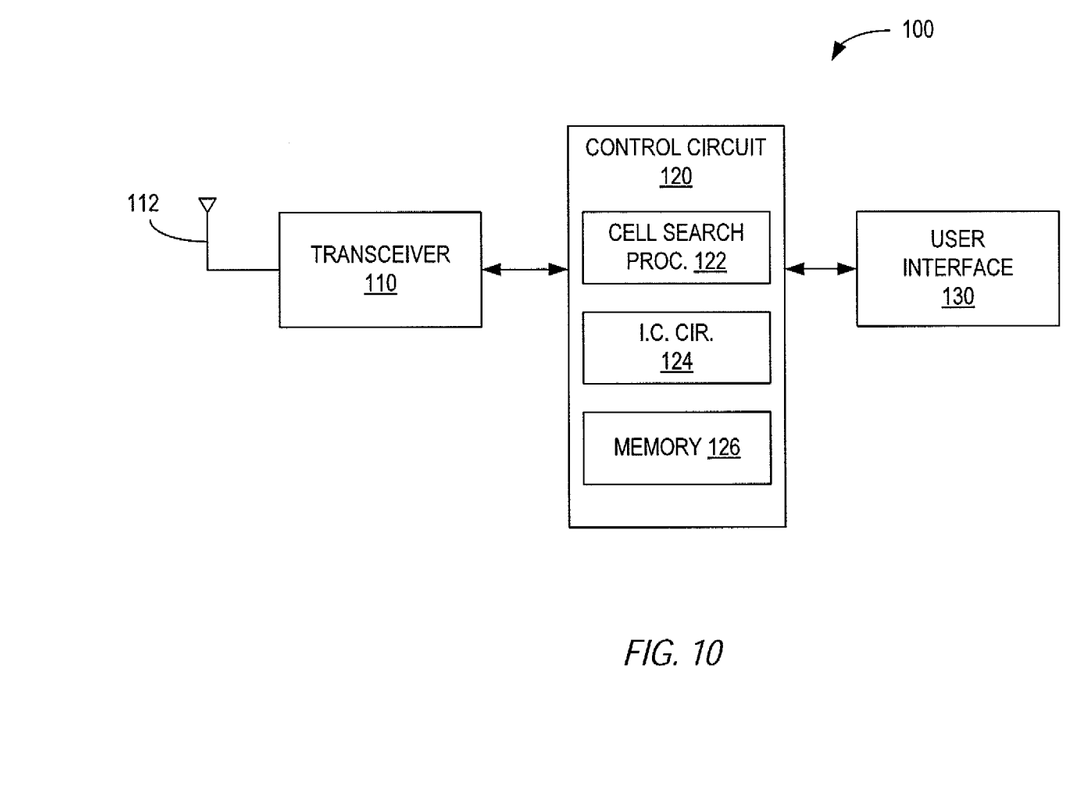
FIG. 10 illustrates an exemplary wireless terminal.

FIG. 10 illustrates an exemplary wireless terminal or user equipment 100 configured to implement the procedures 400, 500 in FIGS. 8 and 9. The wireless terminal 100 comprises a transceiver 110 coupled to an antenna 12, a control circuit 120, and a user interface 130. In the exemplary embodiment, the transceiver 110 comprises a standard cellular transceiver operating according to the LTE standard or other standard now known or later developed. The control circuit 120 comprises a cell search circuit 122, interference cancellation circuit 124, and memory 126. The cell search circuit 122 performs the search procedure as shown in FIG. 8, while the interference cancellation circuit 124 performs the interference cancellation procedure shown in FIG. 9. Memory 126 stores program instructions and data used by the cell search circuit 122 and interference cancellation circuit 124. Those skilled in the art will appreciate that the control circuit 120 may be implemented by one or more microprocessors, hardware, firmware, or a combination thereof. In some embodiments, the cell search circuit 122 and interference cancellation circuit 124 may be implemented in a single microprocessor. The user interface 130 comprises a conventional display, such as a liquid crystal display or touch screen display, and one or more user input devices, such as keypads, touch pads, function keys, and scrolling devices. The user terminal 100 may include additional elements, such as a microphone and speaker, which are not material to the present invention.

The search procedure as herein described enables detection of low power cells in heterogeneous networks where the transmit power of the low power cells is more than about −8 to −10 dB below the transmit power of the macro cells.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of determining the cell identity of a cell in a wireless network, said method comprising:
   correlating a first signal originating from an unknown cell in a first time period with a first set of possible synchronization signals to obtain a first set of correlations;
   correlating a second signal originating from the unknown cell in a second time period with a second set of possible synchronization signals to obtain a second set of correlations;
   selecting a candidate set of cell identities for the unknown cell based on the first and second sets of correlations;
   correlating a third signal originating from the unknown cell in a third time period with a set of reference signals corresponding to the cell identities in the candidate set to obtain a third set of correlations; and
   selecting a cell identity associated with a reference signal in said third set having the greatest correlation with the third signal.

2. The method of claim 1 wherein the first set of possible synchronization signals comprises a set of possible secondary synchronization signals transmitted in the first time period, and wherein the second set of possible synchronization signals comprises a set of possible secondary synchronization signals transmitted in the second time period.

3. The method of claim 2 wherein the set of reference signals comprises cell-specific reference signals transmitted in the third time period.

4. The method of claim 3 wherein the third time period comprises an almost blank subframe or a broadcast subframe.

5. The method of claim 1 further comprising removing interference from at least one of the first and second signals attributable to an interfering signal from a previously detected cell prior to correlating the first signal with the first set of possible synchronization signals.

6. The method of claim 5 wherein the interfering signal comprises a secondary synchronization signal transmitted by the previously detected cell.

7. The method of claim 6 wherein removing interference from the at least one of first and second signals comprises:
   determining a channel estimate associated with the interfering signal; and
   generating an estimate of the interfering signal from the secondary synchronization signal transmitted by the previously detected cell and the channel estimate.

8. The method of claim 7 wherein determining the channel estimate associated with the interfering signal comprises:
   receiving a primary synchronization signal from the previously detected cell; and
   generating a channel estimate from the received primary synchronization signal.

9. The method of claim 5 wherein removing interference from the at least one of first and second signals comprises using successive interference cancellation techniques.

10. A wireless terminal comprising:
    a transceiver to communicate with a base station in the wireless network;
    a control circuit including a cell search circuit for identifying neighbor cells from signals received by said transceiver, said cell search circuit configured to:
       correlate a first signal originating from an unknown cell in a first time period with a first set of possible synchronization signals to obtain a first set of correlations;
       correlate a second signal originating from an unknown cell in a second time period with a second set of possible synchronization signals to obtain a second set of correlations;
       select a candidate set of cell identities for the unknown cell based on the first and second sets of correlations;
       correlate a third signal originating from an unknown cell in a third time period with a set of reference signals corresponding to the cell identities in the candidate set to obtain a third set of correlations; and
       select a cell identity associated with a reference signal in said third set having the greatest correlation with the third signal.

11. The wireless terminal of claim 10 wherein the first set of possible synchronization signals comprises a set of possible secondary synchronization signals transmitted in the first time period, and wherein the second set of possible synchronization signals comprises a set of possible secondary synchronization signals transmitted in the second time period.

12. The wireless terminal of claim 11 wherein the set of reference signals comprises cell-specific reference signals transmitted in the third time period.

13. The wireless terminal of claim 12 wherein the third time period comprises an almost blank subframe or a broadcast subframe.

14. The wireless terminal of claim 10 wherein the control circuit further includes an interference cancellation circuit to remove interference from at least one of the first and second signals attributable to an interfering signal from a previously detected cell prior to correlating the first signals with the first set of possible synchronization signals.

15. The wireless terminal of claim 14 wherein the interfering signal comprises a secondary synchronization signal transmitted by the previously detected cell.

16. The wireless terminal of claim 15 wherein the interference cancellation circuit removes interference from the at least one of the first and second signals by:
    determining a channel estimate associated with the interfering signal; and
    generating an estimate of the interfering signal from the secondary synchronization signal transmitted by the previously detected cell and the channel estimate.

17. The wireless terminal of claim 16 wherein the interference cancellation circuit determines the channel estimate associated with the interfering signal by:
    receiving a primary synchronization signal from the previously detected cell; and
    generating a channel estimate from the received primary synchronization signal.

18. The wireless terminal of claim 14 wherein the interference cancellation circuit removes interference from the at least one of the first and second signals by using successive interference cancellation techniques.

* * * * *